(12) United States Patent
Luo et al.

(10) Patent No.: US 7,948,832 B1
(45) Date of Patent: May 24, 2011

(54) TIME ZONE DETERMINATION (75) Inventors: Qingshan Luo, Palo Alto, CA (US);
Tim Dierks, Brooklyn, NY (US);
Arturo Crespo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 11/479,931

(22) Filed: Jun. 29, 2006

(51) Int. Cl.
*G04B 19/22* (2006.01)
*G06F 15/16* (2006.01)

(52) U.S. Cl. .............................. 368/21; 368/46; 709/203

(58) Field of Classification Search .................... 368/21, 368/47, 46
See application file for complete search history.

(56) References Cited

U.S. PATENT DOCUMENTS

| | | | |
|---|---|---|---|
| 4,565,454 A * | 1/1986 | Walters | 368/47 |
| 5,594,867 A | 1/1997 | Yoshida | |
| 5,845,257 A | 12/1998 | Fu et al. | |
| 6,198,696 B1 | 3/2001 | Korpi et al. | |
| 7,110,964 B2 | 9/2006 | Tengler et al. | |
| 7,116,985 B2 | 10/2006 | Wilson et al. | |
| 7,123,143 B2 | 10/2006 | Zank et al. | |
| 2003/0115258 A1* | 6/2003 | Baumeister et al. | 709/203 |
| 2006/0271623 A1* | 11/2006 | Horowitz et al. | 709/203 |
| 2007/0133501 A1* | 6/2007 | Park | 370/350 |
| 2007/0143394 A1* | 6/2007 | Van Eaton et al. | 709/203 |
| 2007/0157168 A1* | 7/2007 | Traxel et al. | 717/120 |
| 2007/0201311 A1* | 8/2007 | Olson | 368/29 |

* cited by examiner

*Primary Examiner* — Sean Kayes
(74) *Attorney, Agent, or Firm* — Fish & Richardson P.C.

(57) ABSTRACT

A computer-implemented method of determining a time zone for a computing device is disclosed. The method includes identifying a first time offset for the device at a first instant in time, identifying a second time offset for the device at a second instant in time, and determining a time zone for the device using the first and second offsets.

16 Claims, 6 Drawing Sheets

TIME ZONE DETERMINATION

TECHNICAL FIELD

The disclosed implementations are generally related to methods and systems for determining a time zone to associate with a computing device such as a personal computer.

BACKGROUND

A number of computer applications may need to determine the accurate local time for a computing device, such as a personal computer, a personal digital assistant (PDA), or a smartphone. For example, e-mail applications generally timestamp messages, and such timestamps may be important for verifying when a message was sent, e.g., if a deadline is set for midnight at a time local to the user. Likewise, on-line billing systems may need an accurate local time for a user, such as when the user needs to establish that a purchase or other transaction was completed before midnight on December 31 for tax purposes. In addition, calendar or scheduling programs need to express the time for meetings in terms of a local time for each attendee of the meeting.

Time zones are generally based on 24 vertical bands that span 15 degrees of the circumference around the earth (with the bands narrowing to points at the poles). Determining a local time zone is not as simple as determining a longitude of a computing device and matching it to one of the 24 bands, because those 24 bands do not actually define the real-world time zones. Rather, time zones are selected politically—typically to match political boundaries such as state or national borders. In general, most locales lie in or to the West of the putative time zone band. As such, some time zones may cover areas that appear to be essentially arbitrary at first look.

Daylight savings time introduces yet another wrinkle into accurate local time determination. Specifically, daylight savings time results in the time in an area shifting suddenly by one hour ("Spring forward; Fall back."). However, some areas (e.g., Arizona and parts of Indiana) do not recognize daylight savings time at all, so their time zones appear to shift relative to areas that do recognize daylight savings time. Also, some areas recognize daylight savings time on different dates than do other areas. These differences become more pronounced when one looks across different countries—producing several hundred different time zones in the world. And they become even more complicated when jurisdictions change their time zone rules, such as Brazil, which announces its daylight savings time rules annually, so that databases of time zones may quickly become out-of-date.

SUMMARY

This document describes systems and techniques for determining a time zone for a computing device. In general, the systems and techniques may make inferences about a device using time-based information from the device and locational information about the device, to identify a time zone by selecting a best fit for the information. For example, a system may acquire time information for the device at two or more points in time, generally during and outside of daylight savings time, and may also acquire locational information about the device, such as by analyzing an IP address for the device. The system may use such information to narrow the class of possible time zones for the device until a time zone may be identified for the device.

In one implementation, a computer-implemented method of determining a time zone for a computing device is disclosed. The method comprises identifying a first time offset for the device at a first instant in time, identifying a second time offset for the device at a second instant in time, and determining a time zone for the device using the first and second offsets. The first and second time offsets may be GMT time offsets, and the method may further comprise identifying one or more GMT offsets in addition to the first and second GMT offsets, and determining a time zone for the device using a plurality of the identified GMT offsets. The one or more additional offsets may be identified if the first and second offsets are insufficient for determining a time zone for the device. Also, the first and second time offsets may be expressed in the form of a time period, and may be express in terms of minutes.

In some aspects, the first instant in time may be during daylight savings time and the second instant in time may be outside daylight savings time. The first and second standard time offsets may also be identified using a standard Javascript call. In addition, the method may further comprise generating a location identifier that provides an approximate location for the device, and determining a time zone for the device using the first and second offsets and the location identifier. The location identifier may be generated if the first and second offsets are insufficient to determine a time zone for the device. In addition, the location identifier may be generated using an IP address associated with the device. The method may also comprise obtaining an operating system identifier for the device and determining a time zone for the device using the first and second offsets and the operating system identifier In another implementation, an electronic system for identifying a time zone for an electronic device comprises a time zone offset database storing two or more time zone offsets for the electronic device, a localization module to generate an estimate of a location of the device based on a information received from the device, a geolocation/time zone database storing correlations between geolocations and time zones that cover the geolocations, and a time zone determination engine programmed to identify a time zone for the device using the two or more time zone offsets. The time zone offset database may store time zone offsets as GMT offsets. Also, the GMT offsets may be stated in terms of whole hours. The time zone determination engine may also be programmed to identify a time zone for the device using the two or more time zone offsets and the location estimate.

In yet another implementation, an electronic system for identifying a time zone for an electronic device is disclosed. The system may include a time zone offset database storing two or more time zone offsets for the electronic device, a geolocation/time zone database storing correlations between geolocations and time zones that cover the geolocations, and means for identifying a time zone for the device using the time zone offsets and the geolocation/time zone correlations.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
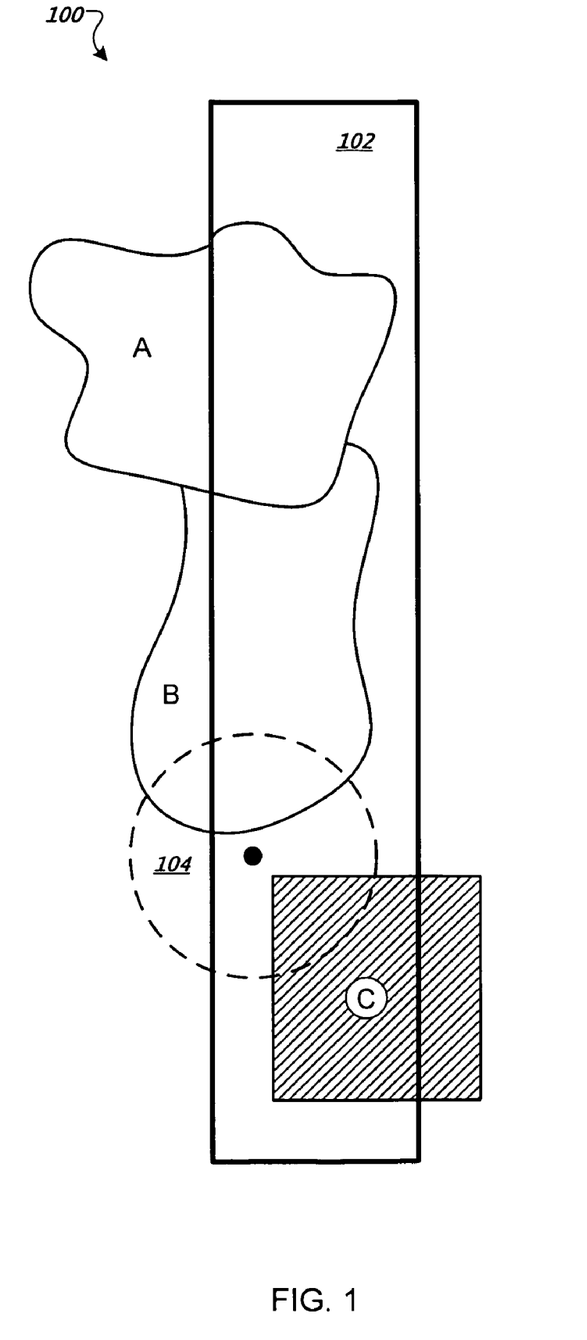
FIG. 1 shows the relationship of various areas in an exemplary time zone.

FIG. 1 shows the relationship of various areas in an exemplary time zone. A standard, or natural, time zone 102 is shown as a vertical band, and does not represent any particular world time zone in this example. Time is generally expressed in a 24-hour format so as to eliminate ambiguity about a.m. and p.m. designations. The time zone 102 may have a time that is measured as an offset from Coordinated Universal Time (UTC) or Greenwich Mean Time (GMT), which are treated as the same time here. For example, the time in San Francisco, Calif. can be referenced as UTC-8, while the time in Stockholm, Sweden can be referenced as UTC+1. In other words, if it is 12:00 UTC (e.g., in Greenwich, England), then it is 04:00 in San Francisco and 13:00 in Stockholm. These values may differ during daylight savings time.

Standard time zone 102 covers three distinct political areas A, B, C. Areas A and B follow a similar approach for daylight savings time, while area C follows an approach that differs from areas A and B, as shown in by a shading in area C. The areas (A, B, and C) do not follow standard time zone 102 exactly, and thus expand the geographic range of standard time zone 102 to the East and the West to form the actual time zone. In addition, because the areas A, B, and C do not follow a consistent approach with respect to daylight savings time, two different time zones are actually showing in FIG. 1 as part of standard time zone 102. (The term time zone references an area that follows a common approach to time and a common offset, while the term standard time zone refers in this figure to the 15 degrees of world circumference nearest the relevant time zones.)

The areas B and C are also served by one or more Internet service providers, as shown by coverage area 104. Coverage area 104 may represent, for example, the general coverage for an Internet service provider, which may be associated with an IP address of the Internet service provider. Alternatively, coverage area 104 may represent an area covered by a particular wireless relay such as a cellular telephone tower.

In the methods described in more detail below, a system may be programmed to determine in what time zone a computing device is located (e.g., as between the time zone for areas A and B versus the time zone for area C). For example, a system may be contacted by a device in area C. the system may then determine an approximate location of the device by analyzing a message from the device to associate the device with an IP address for coverage area 104. Such information may only identify that the device has been located in either the time zone for area B or the time zone for area C.

Such a system may additionally obtain time information for the device for a plurality of different times, such as a time selected to be during daylight savings time, and a time selected to be outside of daylight savings time. One of those times will differ between area B and area C (because area C does not recognize daylight savings time, and area B does), so that a definitive determination may be made that the computing device used in area C and its related time zone if the recovered times are the same. The system may subsequently determine the appropriate local time for the device. Thus, in this manner, offset and location information may be applied apart or together to identify a proper time zone.

Such a technique may provide more accurate time zone determination than is available with other techniques. For example, it is believed that Microsoft Windows handles only a relatively small part (i.e., about 75) of the hundreds of time zones listed in the publicly-available tz database. In addition, the Windows system does not appear to consider time zone change history, such as China's use of daylight savings time from 1986 to 1992, so that conversion to and from China time during the Summer for those years can yield wrong results. Also, a review of the Windows system indicates that it does not provide accurate daylight savings rules for certain time zones. For example, for Cairo, Windows shows a daylight savings time start/end as May/September, when it is properly April/September Also, Windows shows Jerusalem as having no daylight savings time, when it actually has March/September daylight savings time start/end months. In short, the techniques described here may provide accuracy that is not available by simply using tools that are part of a user's standard operating system.

Figure 2:
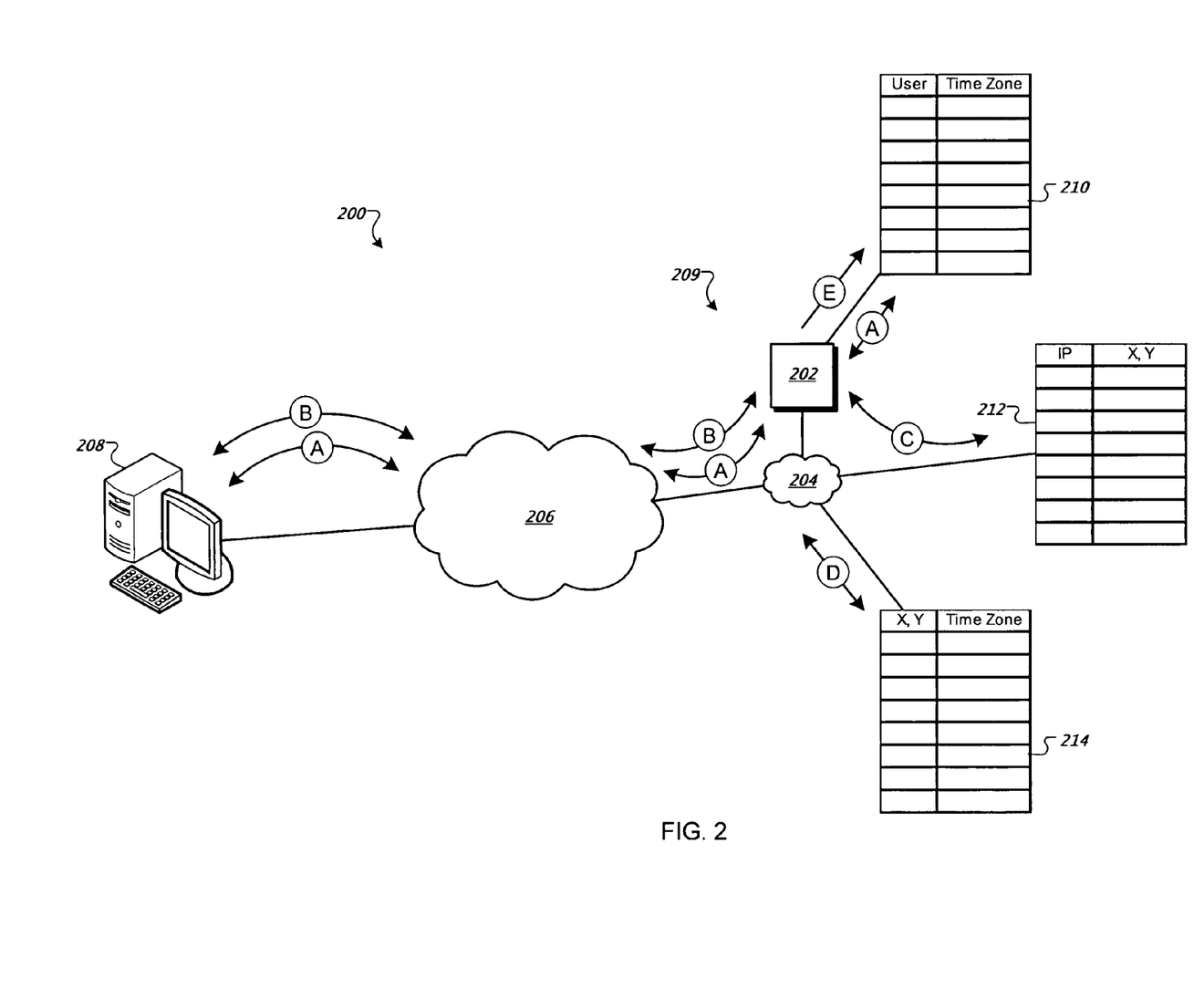
FIG. 2 shows a conceptual flow of a process for determining a time zone to associate with a computing device.

FIG. 2 shows a conceptual flow 200 of a process for determining a time zone to associate with a computing device. The exemplary process occurs between a computing device 208 and a central system 209 communicating over the internet 206. Various components of central system 209 may further communicate over network 204, such as a LAN or WAN. The components of central system 209 may also be joined in a single computer, or may be distributed across multiple locations (operating by one or more organizations), and may also communicate with each other over the Internet 206. The particular arrangement of the components is not critical.

In the central system 209, a time zone determination engine 202 obtains information from, and stores information in, a number of databases. Database 210 stores time zone information for various users of central system 209. For example, database 210 may include a field for a unique user ID, and a field representing a time zone in which the user's device has been determined to be located. The unique user ID may be an ID that is common across various applications (not shown) associated with central system 209, so that database 210 may be readily accessed by various different applications. For example, an e-mail application (not shown) may access database 210 to obtain accurate local time information for a device that sends or receives an e-mail message. Likewise, an e-commerce system may access database 210 to obtain information for properly time stamping a transaction associated with a user.

Database 212 stores correlations between IP addresses and geolocations. Database 212 may be stored locally by central system 209, or may be accessed by central system 209 from another location. For example, a public database may store correlations between IP addresses and geolocations. Using database 212, time zone determination engine 202 may determine an approximate location of a computing device that communicates with central system 209. The central system 209 may also load data from appropriate files and store it in memory for analysis, rather than using any formal database.

Database 214 stores correlations between geolocations and time zones. In particular, each of the several hundred times zones in the world may be defined by a bounded area. This bounded area or approximation of a bounded area may be stored as a field in database 214, which may be associated with a unique time zone ID. Information in database 214 may be derived from the tz database.

In operation, the computing device 208 may access central system 209, such as to use services provided by central system 209. For example, the computing device 208 may seek to make an online purchase and may use components associated with central system 209 to make a payment for the purchase. The arrows labeled A represent the flow of information and processes that occur as a result of the computing device's accessing of central system 209. In particular, time zone determination engine 202 may first check database 210 to determine whether a time zone has already been associated with the user of computing device 208. If such a time zone has not already been associated with the user, the time zone determination engine may begin a process for associating such a time zone.

For example, the time zone determination engine 202 may analyze a message received from computing device 208 and may parse the message to extract an IP address associated with the computing device 208. This IP address may serve as a location identifier for the computing device 208. Alternatively, a GPS location identifier may be extracted from a message to provide a precise location for the computing device 208. Where the location is sufficiently detailed to permit a determination of a time zone for computing device 208, the time zone determination engine 202 may make such a determination, and may write the appropriate time zone into database 210. Where the location identifier is sufficiently detailed, the time zone determination engine 202 may identify an appropriate time zone by querying the database 214 with the location identifier, or information associated with the location identifier.

If the location identifier is not sufficiently specific or detailed to permit an identification of a particular time zone, the time zone determination engine 202 may acquire additional information from computing device 208. For example, the time zone determination engine 202 may submit to computing device 208 requests to identify a time for computing device 208. These requests may be implemented, for example, by JavaScript code running on time zone determination engine 202 and/or computing device 208. The requests may be in a form supported by standard Java libraries, such as the Date and Calendar classes, and may result in the return of time indicators in a standard format.

The requests may be for two or more times that are widely separated, such as two times that are approximately six months apart. The time of the requests may be particularly selected so as to cover a time during daylight savings time and a time outside of daylight savings time. The flow of requests and responses from computing device 208 are showing in FIG. 2 by arrows labeled B. The process may alternatively prefer time zone information over location information, such as by selecting a time zone if possible by acquiring a plurality of time offsets, and using location information if multiple plausible time zones for the offsets exist.

In one implementation, approximately ten instants in time may be used to calculate a corresponding approximately ten offsets. The instants in time may be chosen so that the resulting group of offsets will sufficiently differentiate among the 114 unique world time zone groups—where each time zone in a group has identical rules for daylight savings time and GMT offset. The instants in time may be past instants in time, such as instants several years in the past.

In addition, an identifier of the operating system of the device may also be obtained, so that operating system-specific behavior with respect to offsets may be taken into account in determining the time zone of a device. For example, certain operating systems or applications may treat offsets in a known manner that differs from other operating system or from the accurate treatment. Knowledge of the operating system may, in such cases, aid in understanding the import of offset data for a group of offsets.

If there are multiple time zones in a group, then geolocation data may be used to find a best match. The operation may occur in a single request to computing device 208, which may encode the result and send it back to the central system 209.

The time zone determination engine 202 may then a acquire a location identifier for the computing device 208, such as by using an IP address extracted from a message from the computing device 208, and querying database 212 with the IP address, as shown by arrow C. Alternatively, the location identifier may have been previously determined, and the time zone determination engine 202 may use such a location identifier. The order in which a location identifier is considered and offset information is considered may differ depending on the implementation.

The time zone determination engine 202 may then use the gathered information to identify one or more times zones that satisfy an intersection point for each part of the gathered information. For example, the location identifier may correspond to three different potential time zones. In addition, the times or time offsets acquired for the computing device 208 may differ from each other in terms of offset from UTC or GMT, such as by one hour. If only one of the three time zones associated with the location identifier has such variants, the system may determine that that time zone is the appropriate time zone to associate with computing device 208 or the user of computing device 208.

If, on the other hand, multiple time zones meet the standards for the gathered information (e.g., fall within the range of the location identifier and have offset behavior similar to that gathered for the device), additional determinations may be made by the time zone determination engine 202. For example, time zone determination engine 202 may seek additional, more specific location identifiers for computing device 208, and then may apply those newer location identifiers against the other gathered information. Alternatively, only offset information may be sought initially, and if that information I not sufficient, additional offset information and/or locational information may be acquired.

Also, time zone determination engine 202 may look at other data, such as population data, for possible time zones to select a best time zone. For example, if the population of one time zone greatly exceeds the population of another time zone, for example, the time zone for the area of substantially larger population may be selected for computing device 208. In addition, another time offset request may be submitted to computing device 210, which may be selected for a time, such as a time that varies several years from the times for the first two retrieved offsets, so as to obtain additional information about the time zone of computing device 208.

Figure 3:
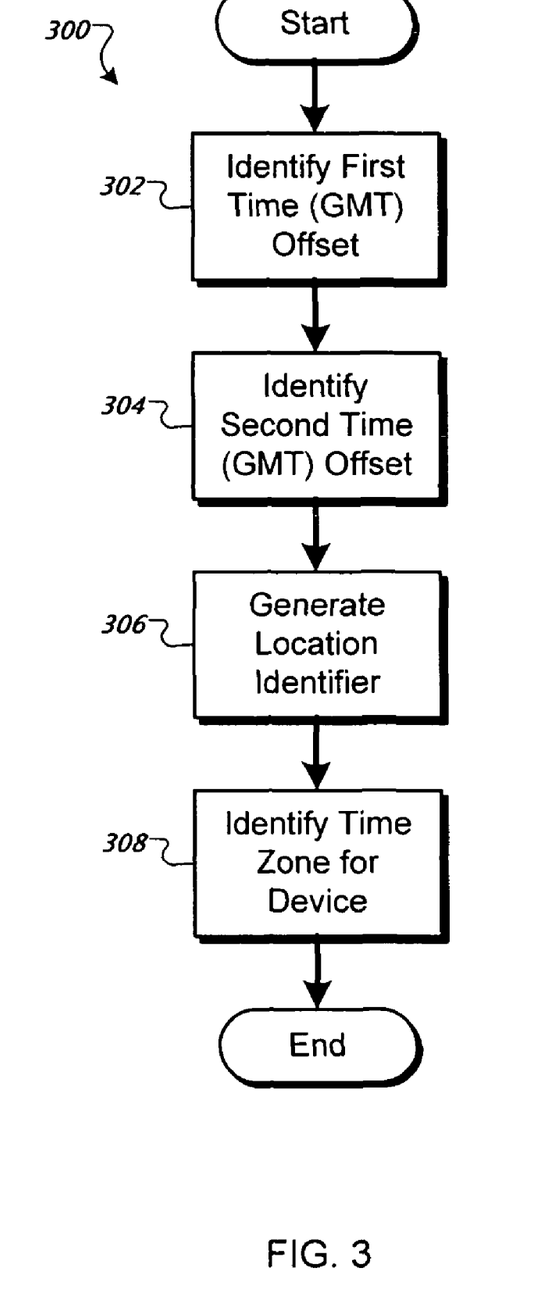
FIG. 3. is a flow chart showing steps in a process for determining a time zone to associate with a computing device

FIG. 3. is a flow chart 300 showing steps in a process for determining a time zone to associate with a computing device. At box 302, the process identifies a first time offset for a computing device. The offset may be, for example, a UTC/GMT offset, expressed, for example, in terms of hours or minutes of offset. In one Javascript implementation, code like the following may be used to acquire offset information:

date1=new Date(2005, 0, 1, 12, 0, 0, 0); // construct a date for 2005-01-01 00:00:00
    return date1.getTimezoneOffset( ); // return the GMT offset in minutes for the date At box 304, the process identifies a second time offset for the computing device. The second time offset may be determined for a time period that is separated from the first time period by a set distance in time. For example, the two time periods may be offset by approximately 6 months to help ensure that one time period is during daylight savings time, while the other is outside of daylight savings time. In this manner, the provision of two offsets may provide a greater amount of additional information about the device's likely time zone, and particularly whether the time zone is one that recognizes daylight savings time. Additional time offsets may also be computed for other times. The number of offsets sought, and the times for which to seek the offsets, may be the result of analysis of characteristics of the available time zones, so that a minimal number of offset readings may help maximize the ability to resolve a time zone from among multiple possible time zones At box 306, a location identifier for the device is generated. As one example, a location of a telecommunications tower through which the device communicates may be identified, and a coverage area for the tower may be determined using available information. In another example, an explicit location identifier may be received, such as by GPS information that is part of a message received from the computing device. In yet another example, an IP address identifying a service provider associated with the computing device may be parsed from a message from the computing device. The IP address may then be associated with the location of the service provider, or with an area served by the service provider. The area may be defined, for example, by a bounding box, whose coverage may be compared to other areas (e.g., areas covered by various time zones) described later. Various other known techniques for determining geolocation of a device, including through use of commercially-available software and services, may likewise be employed.

The location identifier may be sufficient by itself to identify a time zone for the device if it is specific, such as a GPS location. In such a situation, time offset information may not be needed to identify the device's time zone, and the generation of a location identifier 306 may occur before the identification of time offsets 302, 304, so as to avoid unnecessary computational steps.

At box 308, a time zone for the device is identified or determined. The identified time zone may be, for example, the single time zone at a time zone database, such as the publicly available tz database, that matches the characteristics for the time offsets and the location identifier. To determine which time zone in the database matches the characteristics, the process may first search the database for time zones that overlap with the location identifier or the area associated with the location identifier. The process may then determine the time offset characteristics of each of the candidate time zones, such as the offsets that were received for each of the times submitted to the computing device. The process may then return one of the time zones as the device's time zone if only one time zone meets the characteristics. The process may continue to gather more information if more than one time zone meets the requirements, as discussed above and below, until one time zone can be determined for the device.

Several examples may provide additional detail and clarity about the process. In Example 1, the GMT/UTC offset for Jan. 1, 2005 is determined to be 420 minutes, and the offset for Jul. 1, 2005 is determined to be 360 minutes. The geolocation of the user is determined to be the United States (so as to rule out portions of Canada, Central America, or South America immediately North or South of the user). The best matching time zone would be determined to be "America/Denver" from the tz database, which uses Mountain Standard Time or Mountain Daylight Time.

In Example 2, the GMT/UTC offset for Jan. 1, 2005 is determined to be 420 minutes, and the offset for Jul. 1, 2005 is determined to be 420 minutes. The geolocation of the user is determined to be the United States. The best matching time zone would be determined to be "America/Phoenix," which uses Mountain Standard Time with no Daylight Savings Time.

In Example 3, the GMT/UTC offset for Jan. 1, 2005 is determined to be 360 minutes, and the offset for Jul. 1, 2005 is determined to be 300 minutes. The geolocation of the user is determined to be Mexico. The best matching time zone would be determined to be "America/Mexico_City."

Figure 4:
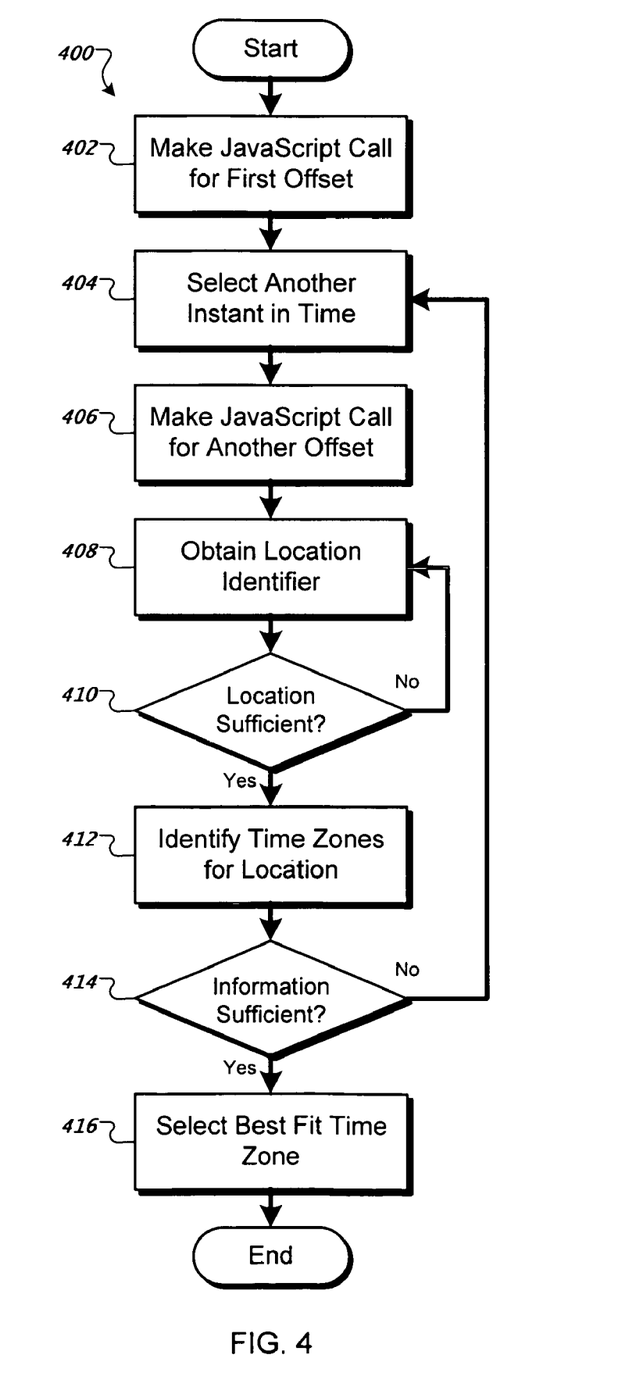
FIG. 4 is another flow chart showing steps in a process for determining a time zone to associate with a computing device.

FIG. 4 is another flow chart showing steps in a process 400 for determining a time zone to associate with a computing device. In general, process 400 is similar in certain ways to process 300 in FIG. 3, but provides additional detail. At box 402, the process makes a JavaScript call for a first time offset. The call may be accomplished, for example, as described above using standard Javascript techniques. Similar approaches may be employed using other languages or platforms, and time offsets may be determined using other available techniques.

At box 404, another instant in time is selected. For example, the first time may be the current time for a computing device. The second time may be selected to be offset from the first time by six months, so as to choose a time that differs with respect to the first time in terms of daylight savings time. Another JavaScript call may then be made (box 406) using the second time to obtain a second time offset for the computing device. In one example, the first time offset and the second time offset may be the same, indicating that the time zone for the device does not recognize daylight savings time. Alternatively, the first time offset and the second time offset may differ by one hour, indicating that the time zone does recognize daylight savings time. Also, times may be checked around the date at which daylight savings time traditionally occurs, if such information may permit for more ready classification of the time zone for the device.

Alternatively, a larger number of offsets, including a predetermined number of offsets, may be obtained. The number of offsets to acquire may be determined by analyzing how many offsets are needed to resolve a particular time zone from among all the available world time zones. In one example, ten or about ten offsets may be obtained. In addition, the operating system of the device may also be obtained, so that operating system-specific behavior with respect to offsets may be taken into account in determine the time zone of a device.

Either before or after the time offsets are obtained, a location identifier may also be obtained (box 408), as described above. The process then checks (410) to determine if the location information is sufficient to permit a reasonable determination of the time zone for the computing device. The information may be sufficient if it relates to a particular geographic area, such as a known coverage area relating to an IP address. The information may be insufficient, for example, if the IP address applies across a very broad area covering many different time zones. If the information is insufficient, the process may seek additional information that might reflect a general location of the device. If the location identifier is very specific, such as a GPS coordinate, the process may be able to identify a time zone directly from that information using, for example, the publicly available tz database.

When adequate location information has been received (but, in some implementation, not enough information to make a time zone determination using the location information alone), the system may identify each of the time zones that correspond to the location identifier. For example, the process may determine that a particular IP address is assigned to a service provider in the upper Midwest, so that the possible time zones include central time zones that recognize daylight savings time and central time zones that do not recognize daylight savings time. The process may thus identify two candidate time zones.

The process may then use the offset information in an attempt to select one of the time zones. If the offset information is sufficient to make such a selection, such as by showing the same offset at two different times and thus indicating that the time zone that does not recognize daylight savings time is the appropriate selection (act 414), the process may select that time zone (box 416). If there is insufficient evidence to make a sufficient determination of the proper time zone, then the process may obtain additional information, such as another time offset. The process may then attempt to resolve a time zone for the device from the original information and the additional information, until a single time zone is indicated, or one time zone is sufficiently more likely as a proper time zone than is any other, so that it can be considered as a time zone properly determined by the process. The process may also seek a larger number of offsets initially, with the number selected so that a single inquiry for multiple offsets can be expected to resolve all or almost all time zone questions.

Figure 5:
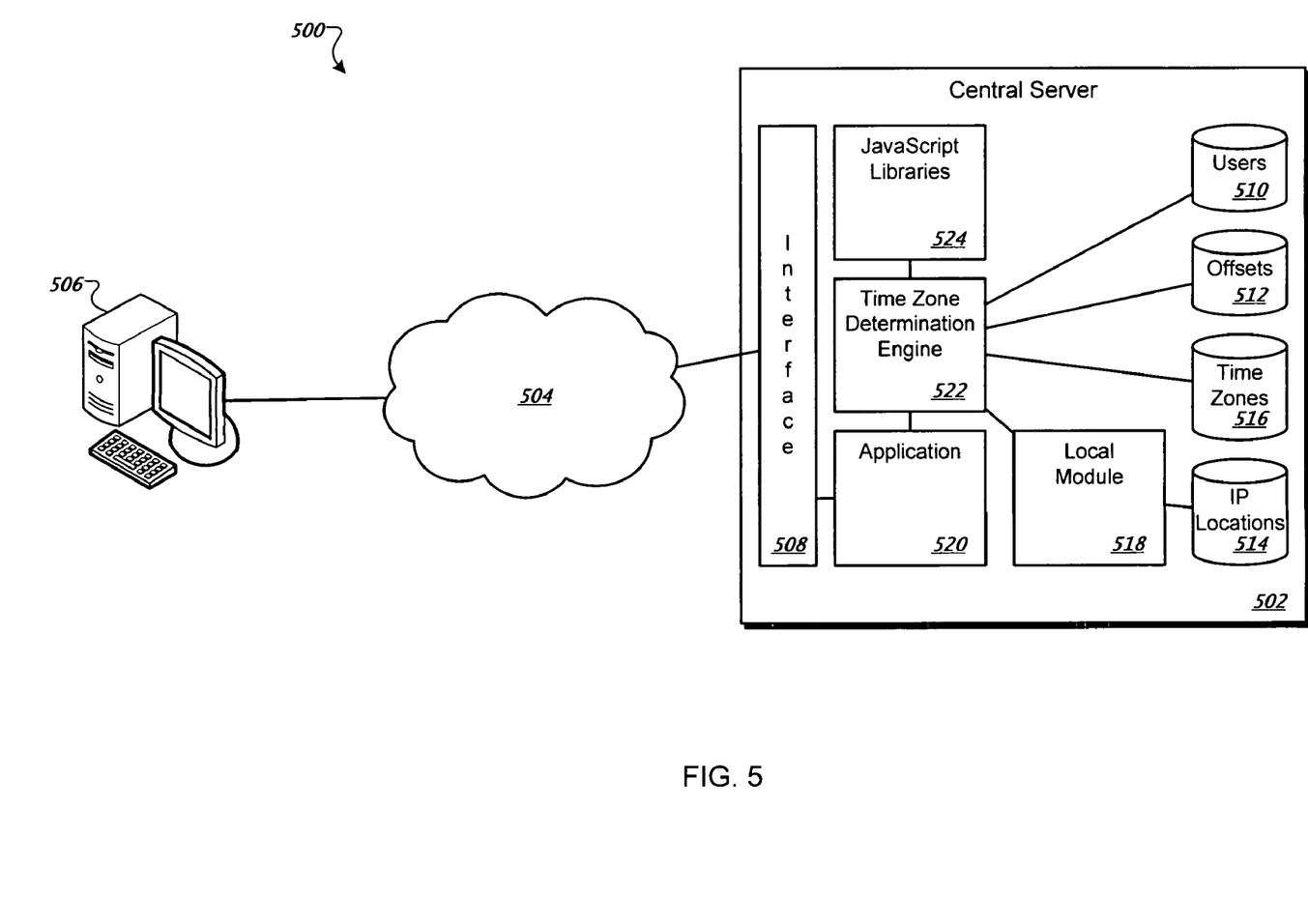
FIG. 5 is a schematic diagram of a system for determining a time zone to associate with a computing device.

FIG. 5 is a schematic diagram of a system 500 for determining a time zone to associate with a computing device. In general, the structures that make up the system may be employed to carry out the various processes described above.

In the figure, a central server 502 is shown communicating with a client 506 through a network 504 such as the internet. The client may take many forms, such as a personal computer, a navigation device, a PDA, or a smartphone. Likewise, the central server 502 may take a variety of forms, including one or multiple servers operated by a single organization or multiple organizations. The terms "client" and "server" do not suggest any particular arrangement or architecture, and simply relate to devices that receive a service and provide a service, respectively. A single device may be a client in some situations and a server in others.

The central server 502 may be provided with an interface 508, which may interpret requests such as queries from users and other similar messages, and provide the requests to other appropriate components in central server 502. The interface 502 may parse requests received from network 504, such as to remove header information and other similar information. Interface 508 may be configured, for example, to accept HTTP requests from users interacting with central server 502 using an application such as a web browser. The interface may be or include, for example, one or more web servers.

Various software applications, such as application 520, may be in communication with interface 508, and may receive messages from, and provide messages to, interface 508. Application 520 may include, for example, electronic mail programs, chat applications, on-line meeting applications, electronic payment systems, and the like.

From time to time, application 520 may need to determine the local time at the location of a device such as client 506. Where a time zone determination has already been made for the client, the time zone may be stored, such as in users database 510, or in the form of a cookie or similar structure stored at the client 506, and may be readily accessed. Where no time zone for a client 506 is stored, the central server 502 may need to determine an appropriate time zone for the client.

Where a time zone determination for a user has not been made (or at least is not currently stored), time zone determination engine 522 may gather data to infer an appropriate time zone with an accuracy that is sufficient for purposes of application 520 and/or other applications associated with server 502. Time zone determination engine 522 may, for example, obtain a location identifier for client 506, such as in the form of an IP address, and may use locale module 518 to query IP location database 514 to obtain a location for, or an area around, the identified IP address. For example, the IP address may indicate the country from which a device is requesting information.

Time zone determination engine 522 may also query client 506 to obtain time zone offsets from the client 506 for different times. For example, the offset for one time might be GMT-7, while the offset for another time might be GMT-8— indicating that the client is in a time zone that recognizes daylight savings time. The offset determination may be made in various manners, including by using standard classes in a set of Javascript libraries 524 that are accessible to time zone determination engine 522. The information received from the client 506 may be compared with information from offset database 512 to obtain a group of time offset figures.

The time zone determination engine may then use time zones database 516 to identify a group of time zones that overlap with the location identifier. From those time zones, the time zone determination engine 522 may identify a single time zone that also matches the identified offsets for the client 506. That time zone may be determined to be the proper time zone for the client 506. If multiple time zone match the received information, additional information may be obtained so that a determination of a particular time zone may be made.

Figure 6:
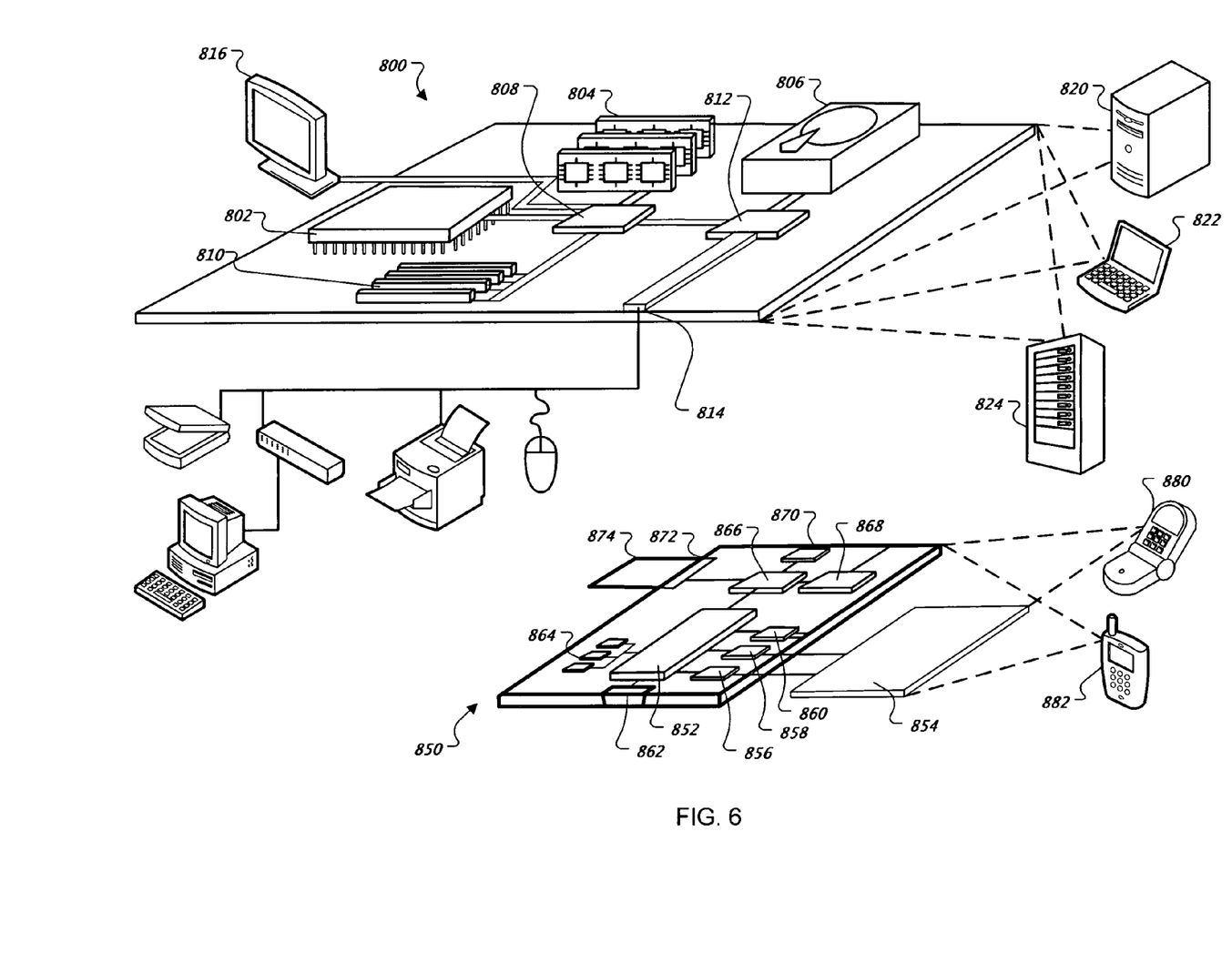
FIG. 6 shows structures suitable for carrying out the processes and methods disclosed with respect to FIGS. 1 to 5.

FIG. 6 shows structures suitable for carrying out the processes and methods disclosed with respect to FIGS. 1 to 5. The structures may be implemented as either a client or as a server or plurality of servers, or a combination of clients and servers. Computing device 800 represents various forms of digital computers, such as laptops, desktops, workstations, personal digital assistants, servers, blade servers, mainframes, and other appropriate computers. Computing device 850 represents various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ('WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for presenting a user with test case information may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of determining a time zone for a computing device, the method comprising:
    identifying a first time offset for the device for a first instant in time;
    identifying a second time offset for the device for a second instant in time;
    storing one or more time zone rules for a plurality of geographical locations in a computer-readable medium;
    determining a time zone for the device that corresponds to the first time offset at the first instant in time and the second time offset at the second instant in time according to the time zone rules; and
    storing the determined time zone for the device in a computer-readable medium.

2. The method of claim 1, wherein the first time offset is a first Greenwich Mean Time (GMT) offset and the second time offset is a second GMT offset.

3. The method of claim 2, further comprising identifying one or more GMT offsets in addition to the first and second GMT offsets, and wherein determining the time zone for the device further comprises using one or more of the identified additional GMT offsets.

4. The method of claim 3, wherein the one or more additional GMT offsets are identified in response to the first and second GMT offsets being insufficient for determining the time zone for the device.

5. The method of claim 1, wherein the first and second time offsets are expressed in terms of a time period.

6. The method of claim 1, wherein the first and second time offsets are expressed in terms of minutes.

7. The method of claim 1, wherein the first instant in time is during daylight saving time and the second instant in time is outside daylight saving time.

8. The method of claim 1, wherein the first and second time offsets are identified using a standard Javascript call.

9. The method of claim 1, further comprising generating a location identifier that provides an approximate location for the device, and wherein determining the time zone for the device further comprises using the location identifier.

10. The method of claim 9, wherein the location identifier is generated in response to the first and second time offsets being insufficient to determine the time zone for the device.

11. The method of claim 10, wherein the location identifier is generated using an IP address associated with the device.

12. The method of claim 1, further comprising obtaining an operating system identifier for the device and wherein determining the time zone for the device further comprises using the operating system identifier.

13. An electronic system for identifying a time zone for an electronic device, comprising:
    a time zone offset database storing two or more time zone offsets for the electronic device;
    a localization module to generate an estimate of a location of the electronic device based on information received from the electronic device;
    a time zones database that stores one or more time zone rules for a plurality of geographical locations;
    a geolocation/time zone database storing correlations between geolocations and time zones that cover the geolocations; and
    a time zone determination engine programmed to identify a time zone for the electronic device using the two or more time zone offsets, the location estimate of the electronic device, the time zone rules, and the correlations between the geolocations and the time zones that cover the geolocations to determine the time zone that corresponds to the two or more time zone offsets according to the time zone rules and according to one or more of the time zones that cover the geolocations that relate to the location estimate of the electronic device.

14. The system of claim 13, wherein the time zone offset database stores the time zone offsets as Greenwich Mean Time (GMT) offsets.

15. The system of claim 13, wherein the time zone offsets are expressed in terms of whole hours.

16. An electronic system for identifying a time zone for an electronic device, comprising:

a time zone offset database storing two or more time zone offsets for the electronic device;

a time zones database storing one or more time zone rules for a plurality of geographical locations;

a geolocation/time zone database storing correlations between geolocations and time zones that cover the geolocations; and means for identifying a time zone for the electronic device using the time zone offsets, the time zone rules, and the correlations between the geolocations and the time zones that cover the geolocations to determine the time zone that corresponds to the two or more time zone offsets according to the time zone rules and according to one or more of the time zones that cover the geolocations.

* * * * *

UNITED STATES PATENT AND TRADEMARK OFFICE
CERTIFICATE OF CORRECTION

| | | |
|---|---|---|
| PATENT NO. | : 7,948,832 B1 | Page 1 of 1 |
| APPLICATION NO. | : 11/479931 | |
| DATED | : May 24, 2011 | |
| INVENTOR(S) | : Luo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this
Twenty-eighth Day of May, 2013

Teresa Stanek Rea
*Acting Director of the United States Patent and Trademark Office*